United States Patent Office 3,227,205
Patented Jan. 4, 1966

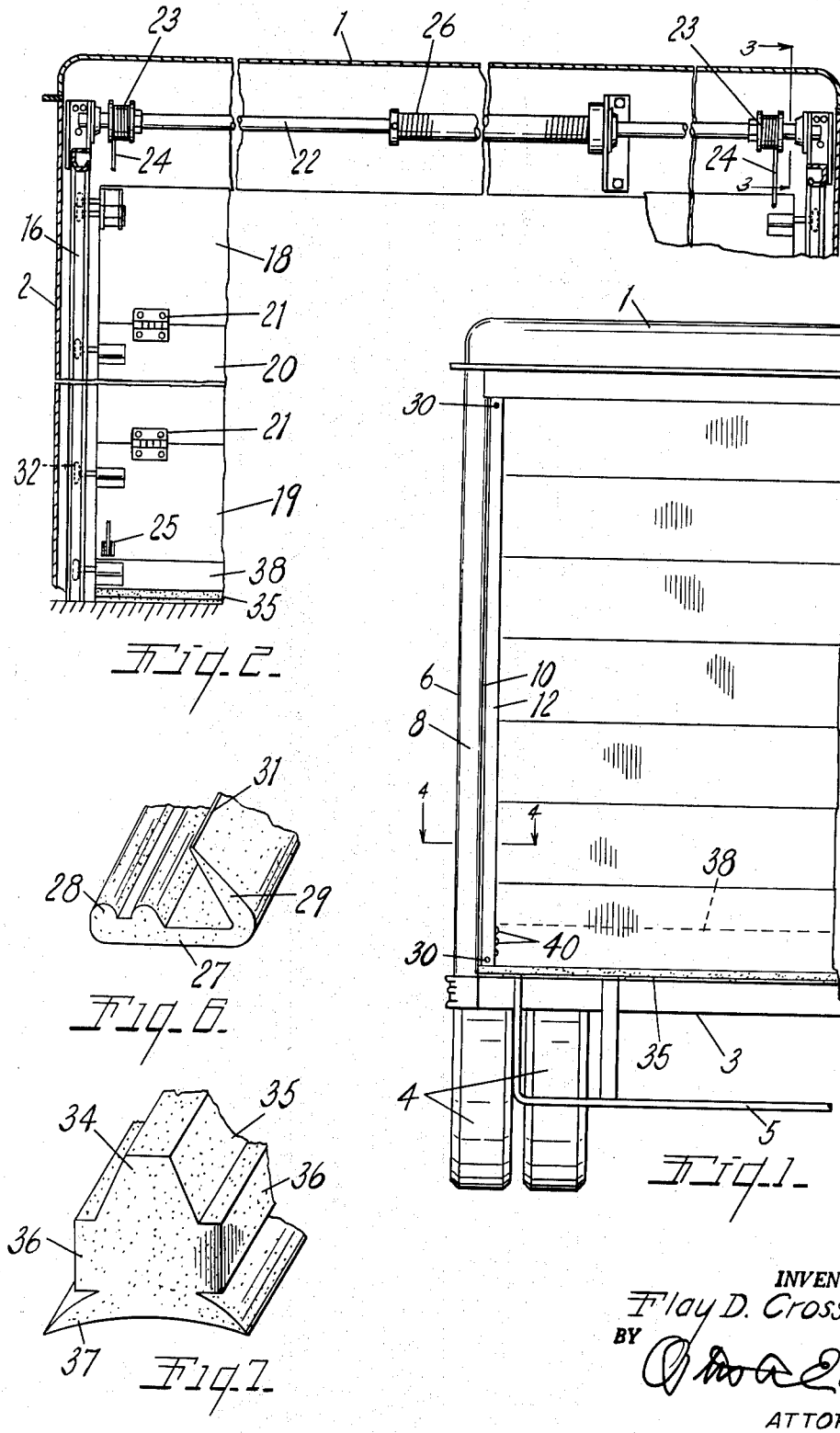

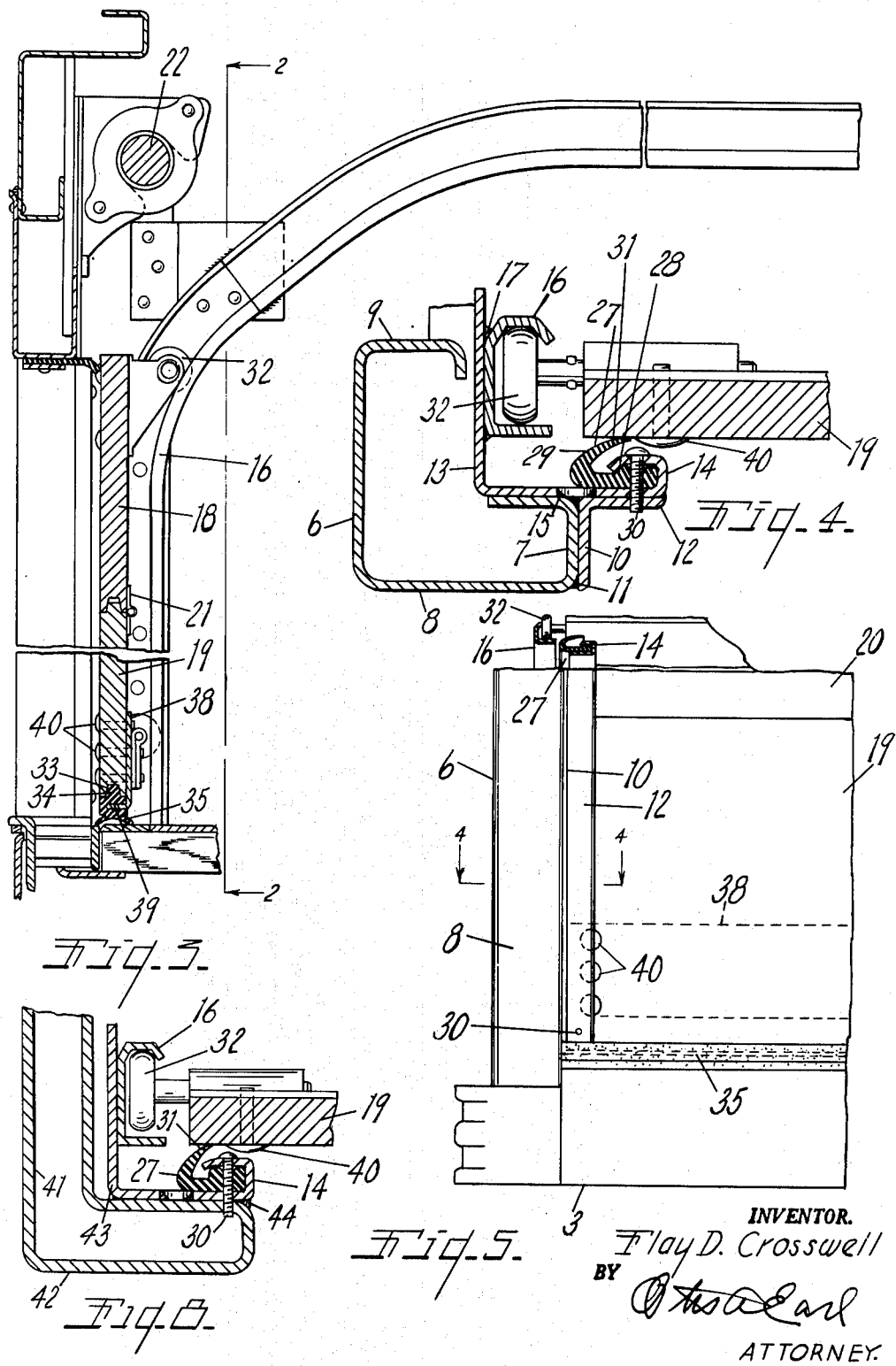

3,227,205
UPWARDLY ACTING DOOR AND SEAL
MEANS THEREFOR
Flay D. Crosswell, Hartford, Ind., assignor to Overhead
Door Corporation, Hartford City, Ind.
Filed Jan. 8, 1962, Ser. No. 164,681
1 Claim. (Cl. 160—40)

This invention relates to upwardly acting doors which are well adapted for embodiment in trucks, trailers, railway cars, and the like. The main objects of this invention are:

First, to provide an upwardly acting door assembly which is well adapted for use in trucks, trailers, railway cars and the like, and which is effectively sealed when in closed position.

Second, to provide an upwardly acting door adapted for the before stated uses in which the seals are housed and guarded when the door is closed so that they are not likely to be injured or distorted accidentally or intentionally and in which the seals are positioned so that they are not injured in loading or unloading the vehicle.

Third, to provide seals having these advantages which coact with associated parts to prevent rattling and vibration.

Objects relating to details and economies of the invention will appear from the description to follow. The invention is defined and pointed out in the claim. The preferred embodiment of the invention is illustrated in the accompanying drawing, in which:

FIG. 1 is a fragmentary rear elevational view of a truck, trailer, or like vehicle, embodying my invention, certain of the parts being shown conventionally.

FIG. 2 is an inside fragmentary view on a line corresponding to line 2—2 of FIG. 3.

FIG. 3 is an enlarged fragmentary view on a line corresponding to line 3—3 of FIG. 2.

FIG. 4 is an enlarged fragmentary horizontal section on a line corresponding to line 4—4 of FIGS. 1 and 5.

FIG. 5 is an enlarged fragmentary rear elevational view.

FIG. 6 is a fragmentary perspective view of one of the jamb seal members.

FIG. 7 is a fragmentary perspective view of the sill seal member.

FIG. 8 is an enlarged fragmentary view corresponding to FIG. 4 of a slightly modified form or embodiment of the applicant's invention.

As stated, one of the objects of the present invention is to provide upwardly acting doors which are well adapted to be used in moving vehicles such as trucks, trailers, and the like, and one such embodiment is illustrated, only such portions of the vehicle being illustrated as are deemed required to show the cooperating relation of the parts. The numeral 1 represents the top of the vehicle, 2 the side walls thereof, and 3 the bottom. 4 represents the wheels and 5 a rear step. In the embodiment illustrated in FIGS. 1 to 7 inclusive, the door frame comprises the side members 6 of inwardly facing angled section and having inwardly projecting outwardly facing angular flanges 7 on their transversely disposed rear arms 8 and angular reinforcing flanges 9 on their forward edges.

Auxiliary door frame members 10 of angular section are disposed to face outwardly and with their outwardly projecting arms thereof upon and fixedly secured thereto as by welds 11, see FIG. 4, and with their arms 12 disposed in the plane of the laterally disposed arms of the upright frame member flanges. Track and seal support members 13 of inwardly facing angular section are disposed with their laterally projecting arms on the inner sides of and fixedly secured to the flanges on said door frame members and said auxiliary frame members, and they terminate at their edges in the channel shaped laterally and inwardly facing seal member holders 14. These track and seal support members are fixedly secured as by welds indicated at 15, see FIG. 4.

Tracks 16 are fixedly secured as by welds indicated at 17 to the inwardly projecting arms of these track and seal support members.

The door of the embodiment illustrated is of the sectional type and comprises top section 18, bottom section 19, and a plurality of intermediate sections 20, these sections being connected by hinges 21. The counterbalancing means comprises a rotatably mounted shaft 22 provided with drums 23 for the cables 24 connected to the bottom section of the door at 25. The details of mounting the shaft and of the counterbalance spring 26, see FIG. 2, are not described as they form no part of the applicant's present invention.

It will be noted that portions of the door are disposed in inwardly spaced relation to the laterally projecting portions of the door frame members when the door is in closed position, see FIGS. 1, 4 and 5. Seal members, designated generally by the numeral 27, are disposed on the inner sides of these laterally projecting arms of the track and seal support members and have body portions 28 which have laterally extending rib-like portions. The body portions 28 of the seal members are supportedly positioned, as is illustrated in FIG. 4, with the rib-like portions under sealing compression as is illustrated in in FIG. 4. These seal members 27 have outwardly projecting flange portions 29 integral therewith. The body portions of these seal members are springably resilient and of such resilience that they may be slidably and sealingly engaged in the holders 14 and while under sealing compression are desirably secured therein by screws or bolts 30 which in the embodiment illustrated have threaded engagement with the flange 12, see FIG. 4. This securing means not only prevents longitudinal movement but prevents their being forced or pulled out laterally. The flexible flanges 31 of these seal members are resilient, but of substantial stiffness and desirably tapered outwardly, and are positioned so that the outer side portions of these flanges are in yielding thrust engagement with the door when the door is in closed position. They are desirably of such resiliency that they act to urge the track engaging rollers 32 of the door against the inner portion of the tracks and thereby prevent vibration. The tracks and rollers as such are of well known form. This arrangement of parts provides an effective seal for the door jamb and all air pressure from the outside on these seals acts to urge them into sealing engagement with the door.

The bottom door section has a centrally disposed longitudinally extending groove 33 in its bottom edge in which the longitudinally extending tongue or rib 34 on the upper side of the sill seal member 35 is fittingly engaged, the seal member having shoulders 36 on both sides of this rib which are in abutting sealing engagement with the edges of the door section 19 on both sides of the groove. This sill seal member has downwardly and laterally projecting resiliently flexible sill engaging flanges or flange-like portions 37. It is secured to the door section 19 by means of the plate-like clip 38 which has a projecting flange 39 on its lower edge fittingly engaged in a slot provided therefor in the seal member, see FIG. 3. This securing member is attached to the bottom section of the door by bolts or rivets 40, see FIG. 3, preferably a plurality of bolts, disposed in vertical alignment at the ends of the clip with their heads on the outer side of the door section, and they are positioned in non-aligned relation with the ends of the screws or rivets 30, see FIGS. 4 and 5. This prevents any contact of these fastening members when the door is being opened and closed.

In the embodiment of my invention shown in FIG. 8, the door frame side members, designated generally by the numeral 41, have integral laterally projecting portions 42 to which the members 43 are fixedly secured by welds, conventionally indicated at 44. In this modification the laterally projecting portion of the door frame side members is of such width that the auxiliary members such as shown in FIG. 4 are not required.

I have illustrated and described my invention in highly practical embodiments thereof. Certain portions of the drawings, as stated, are shown conventionally as the details thereof form no part of the present invention, and it is believed that the embodiments of my invention illustrated will enable those skilled in the art to embody or adapt the same as may be desired.

Having thus described the invention, what is claimed as new and desired to secure by Letters Patent is:

An upwardly acting door assembly comprising door frame side members of inwardly facing angled section and having inwardly projecting outwardly facing angular flanges on their transversely disposed arms, auxiliary door frame members of angular section disposed to face outwardly and with the outwardly projecting arms thereof upon and fixedly secured to the inwardly projecting arms of said door frame side member flanges and with their inner arms disposed in the planes of the laterally projecting arms of said frame member flanges, track and seal support members of inwardly facing angular section disposed with their laterally projecting arms thereof on the inner sides of and secured to said flanges on said door frame members and to said auxiliary frame members and terminating in seal member holders, and a door slidably mounted on the inwardly projecting arms of said support members, portions of the door when closed being in overlapping relation to said transversely projecting arms of said track and seal support members.

References Cited by the Examiner

UNITED STATES PATENTS

| | | | |
|---|---|---|---|
| 2,322,088 | 6/1943 | Black | 160—201 |
| 2,612,947 | 10/1952 | Jenks | 160—40 |
| 2,820,516 | 1/1958 | Cookson et al. | 160—40 |
| 2,827,114 | 3/1958 | Stroup | 160—209 |
| 2,862,256 | 12/1958 | Stroup | 160—40 |
| 2,871,932 | 2/1959 | Stroup | 160—40 |
| 2,968,829 | 1/1961 | Meddick | 160—40 |
| 3,090,427 | 5/1963 | Stroup | 160—40 |

FOREIGN PATENTS 614,566   2/1961   Canada.

HARRISON R. MOSELEY, *Primary Examiner.*

NORTON ANSHER, LAWRENCE CHARLES,
*Examiners.*